US009410357B2

(12) United States Patent
Mottelet et al.

(10) Patent No.: US 9,410,357 B2
(45) Date of Patent: Aug. 9, 2016

(54) CONNECTING JOINT FOR GLAZED WALL AND GLAZED WALL

(71) Applicant: SAINT-GOBAIN GLASS FRANCE, Courbevoie (FR)

(72) Inventors: Béatrice Mottelet, Compiegne (FR); Jean-François Outin, Villennes sur Seine (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/405,352

(22) PCT Filed: May 29, 2013

(86) PCT No.: PCT/FR2013/000136
§ 371 (c)(1),
(2) Date: Dec. 3, 2014

(87) PCT Pub. No.: WO2013/182760
PCT Pub. Date: Dec. 12, 2013

(65) Prior Publication Data

US 2015/0135627 A1 May 21, 2015

(30) Foreign Application Priority Data

Jun. 4, 2012 (FR) ..................................... 12 55176

(51) Int. Cl.
*E06B 3/54* (2006.01)
*E06B 3/56* (2006.01)
(Continued)

(52) U.S. Cl.
CPC ............... *E06B 3/6202* (2013.01); *E04B 2/721* (2013.01); *Y10T 403/47* (2015.01)

(58) Field of Classification Search
CPC ..... E06B 3/6202; E04B 2/721; Y10T 403/47; Y10T 403/473
USPC ................................ 52/204.62, 582.1, 586.1
See application file for complete search history.

(56) References Cited

U.S. PATENT DOCUMENTS 4,599,841 A * 7/1986 Haid ................ E04F 15/02005 52/396.04
4,895,746 A * 1/1990 Mertens .................... G09F 3/02 428/194

(Continued)

FOREIGN PATENT DOCUMENTS

DE 102006010699 A1 * 9/2007 ............ E06B 3/6202
EP 0 945 235 A2 9/1999

(Continued)

OTHER PUBLICATIONS

International Search Report issued in International Patent Application No. PCT/FR2013/000136, dated Oct. 1, 2013.

*Primary Examiner* — Robert Canfield
(74) *Attorney, Agent, or Firm* — Pillsbury Winthrop Shaw Pittman LLP

(57) ABSTRACT

A connecting joint between two panels of a glazed wall is intended to cooperate with a face of each panel and includes: at least one support having a first external face and a second external face; a first fastener arranged on the first external face of the support; a second fastener arranged on the second external face of the support. The right-angle separation force of the first fastener, measured on a glass panel with a mobile-jaw tensile testing machine with a 100 mm/min displacement speed of the mobile jaw, lies between 3 and 20 N/cm, while the right-angle separation force of the second fastener, measured on a glass panel with a mobile-jaw tensile testing machine with a 100 mm/min displacement speed of the mobile jaw, is greater than or equal to 30 N/cm.

25 Claims, 8 Drawing Sheets

(51) Int. Cl.
*E06B 3/62* (2006.01)
*E04B 2/72* (2006.01)

(56) References Cited

U.S. PATENT DOCUMENTS

| | | | | | |
|---|---|---|---|---|---|
| 5,694,730 | A * | 12/1997 | Del Rincon | E04B 1/6154 | 403/298 |
| 6,865,855 | B2 * | 3/2005 | Knauseder | E04B 9/26 | 52/571 |
| 7,377,081 | B2 * | 5/2008 | Ruhdorfer | E04F 15/02 | 52/588.1 |
| 8,171,684 | B2 * | 5/2012 | Demars | E06B 3/6202 | 52/204.593 |
| 2004/0016197 | A1 * | 1/2004 | Ruhdorfer | E04F 15/02 | 52/578 |
| 2006/0241248 | A1 * | 10/2006 | Foreman | C03C 27/10 | 525/477 |
| 2008/0257485 | A1 * | 10/2008 | Xie | C09J 163/00 | 156/247 |
| 2009/0000247 | A1 * | 1/2009 | Demars | E06B 3/6202 | 52/786.1 |

FOREIGN PATENT DOCUMENTS

| | | | | |
|---|---|---|---|---|
| FR | 2 895 427 | A1 | 6/2007 | |
| GB | WO 2004039908 | A1 * | 5/2004 | C03C 27/10 |
| GB | 2432617 | A * | 5/2007 | E04B 1/6813 |
| GB | 2515515 | A * | 12/2014 | E06B 3/5427 |
| WO | 99/31193 | A1 | 6/1999 | |
| WO | 01/79644 | A1 | 10/2001 | |
| WO | 03/040507 | A1 | 5/2003 | |

* cited by examiner

Fig.6
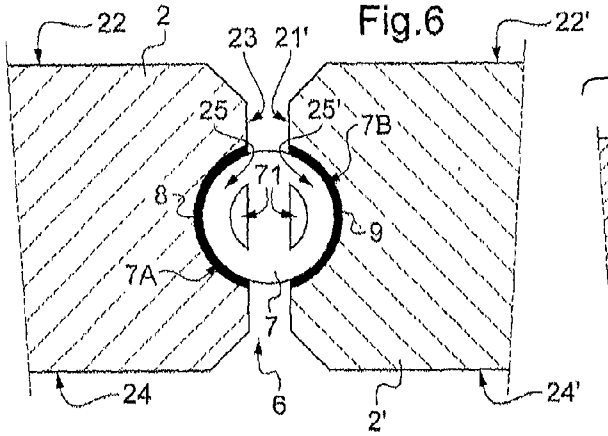
Fig.6A
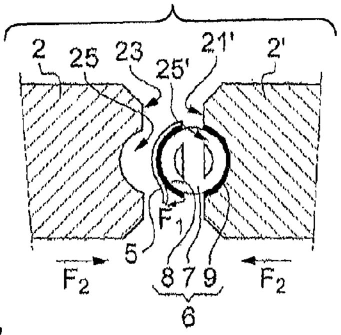
Fig.7
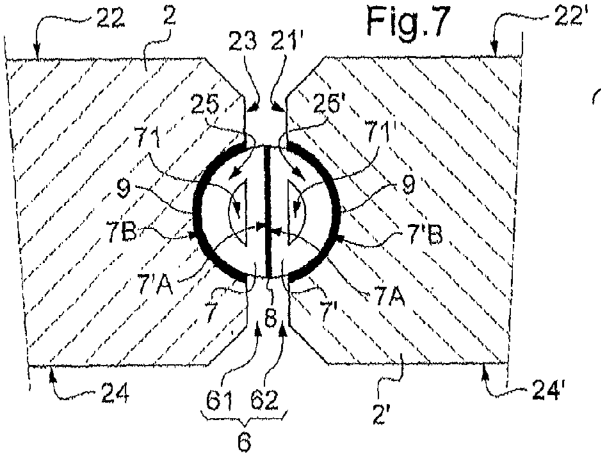
Fig.7A
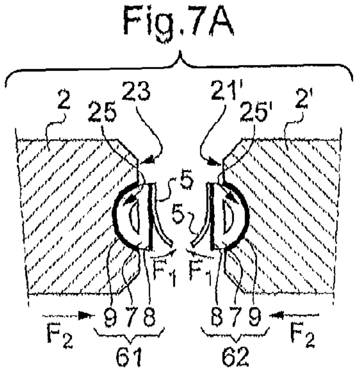
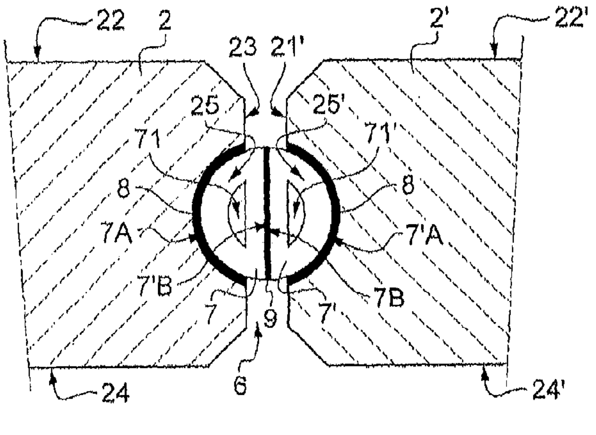
Fig.8

CONNECTING JOINT FOR GLAZED WALL AND GLAZED WALL

CROSS-REFERENCE TO RELATED APPLICATIONS

This application is the U.S. National Stage of PCT/FR2013/000136, filed May 29, 2013, which in turn claims priority to French Application No. 1255176, filed Jun. 4, 2012. The contents of all of these applications are incorporated herein by reference in their entirety.

The present invention relates to a connecting joint between two panels of a glazed wall and to a glazed wall comprising such a connecting joint. The invention also relates to a panel, in particular made of glass, comprising such a connecting joint on at least one of its faces, and to a method for mounting a glazed wall.

A glazed wall comprises a plurality of panels juxtaposed with one another, in which each panel may be single, laminated or multiple glazing. A glazed wall may be used in the construction industry as an interior partition or as a wall connecting with the exterior. In order to obtain a wall which is as esthetic as possible, in particular having the greatest possible viewing surface, it is known to assemble the panels of a glazed wall with the aid of transparent or translucent joints which establish connection between the adjacent edges of the successive panels and prevent transmission of air and noise.

One known solution consists in assembling the edges of the successive panels of a glazed wall with an adhesively bonded joint of the silicone type, which preserves the esthetics of the glazed wall by virtue of its small cross section. However, this solution is difficult to implement. This is because the silicone joint is produced by a pump, which requires dexterity in order to obtain a clean appearance. Furthermore, in the case in which the panels of the glazed wall are multiple glazings, access to the rear of the glazings is not possible, which makes installation and finishing of the silicone joint more complicated. Another drawback of assembly with a silicone joint is that it can be difficult to dismantle. Specifically, in order to remove an intermediate panel, it is necessary to remove the silicone joint then clean the edges of the panels, if the intention is to reinstall another panel. Another known solution is to assemble the edges of the successive panels with a double-sided adhesive joint. Advantageously, the double-sided adhesive joint has a small cross section, which preserves the esthetics of the glazed wall. However, adhesive bonding of the adhesive tapes onto the edges of the panels requires particular care in order to obtain satisfactory vertical alignment of the panels. Furthermore, this assembly is difficult to dismantle because it is necessary to disbond the adhesive.

It is these drawbacks which the invention is more particularly intended to overcome, by providing an adhesive joint between the successive panels of a glazed wall allowing easy mounting and disassembly of the glazed wall, while being discreet in esthetic terms, in particular while preserving the transparent appearance of the glazed wall.

To this end, the invention relates to a connecting joint between a first panel and a second panel of a glazed wall, this connecting joint being adapted to cooperate with a face of each panel and comprising: at least one support having a first external face and a second external face; a first fastening means arranged on the first external face of the support; a second fastening means arranged on the second external face of the support, characterized in that the right-angle separation force of the first fastening means, measured on a glass panel with a mobile-jaw tensile testing machine with a 100 mm/min displacement speed of the mobile jaw, lies between 3 and 20 N/cm, preferably between 3 and 15 N/cm, while the right-angle separation force of the second fastening means, measured on a glass panel with a mobile-jaw tensile testing machine with a 100 mm/min displacement speed of the mobile jaw, is greater than or equal to 30 N/cm.

Preferably, the right-angle separation force of the first fastening means, measured on a glass panel with a mobile-jaw tensile testing machine with a 100 mm/min displacement speed of the mobile jaw, lies between 5 and 15 N/cm.

Preferably, the right-angle separation force of the second fastening means, measured on a glass panel with a mobile-jaw tensile testing machine with a 100 mm/min displacement speed of the mobile jaw, lies between 30 and 40 N/cm.

In the context of the invention, a fastening means may be a layer of adhesive capable of cooperating by adhesive bonding with a face, in particular an edge or a main face, of a panel. As a variant, it may be a mechanical anchoring means capable of cooperating by complementarity with a relief pattern of a panel. In particular, the relief pattern may be a longitudinal groove formed in a face, in particular an edge, of the panel and adapted to receive the mechanical anchoring means with a force fit in its internal volume. When the fastening means is a layer of adhesive, the right-angle separation force is also referred to as the right-angle peeling force.

A connecting joint according to the invention makes it possible to obtain dismantlable fastening between the panels of the glazed wall, by virtue of the first fastening means whose right-angle separation force is adjusted in order to ensure both good cohesion of the glazed wall in the mounted state and easy decohesion when a panel is displaced with respect to an adjacent panel. This results in facilitated mounting of the glazed wall, since it is possible to reposition the panels with respect to one another in the event of poor alignment, as well as facilitated dismantling, since an intermediate panel can easily be extracted from the glazed wall. The connecting joint according to the invention ensures reversible connection between the panels, allowing rapid mounting/dismantling of glazed walls. In the case of interior partitions, it is thus possible to reorganize the space by reusing the same panels. Because of the difference in right-angle separation force between the first fastening means and the second fastening means, the connecting joint can be fixed strongly by means of the second fastening means on one of the two panels between which it is arranged, so that it still remains secured to this panel during dismantling of the glazed wall.

In the scope of the invention, the right-angle separation force of a fastening means, or right-angle peeling force in the case of a layer of adhesive, is measured conventionally with a mobile-jaw tensile testing machine, as shown in appended FIG. 14. The test consists in measuring the force necessary to cause separation, at an angle of 90°, of a flexible support carrying the fastening means to be evaluated, relative to a glass substrate on which it is fixed.

For each fastening means 8, 9 whose right-angle separation force is intended to be determined, three test pieces 103 are prepared, as shown in appended FIGS. 15 and 16. Each test piece 103 comprises a glass substrate 105, on one face 106 of which a flexible support segment 7 carrying the fastening means 8, 9 is fixed. The face 106 may be an edge of the glass substrate or a main face thereof. As an implementation example, the flexible support segment 7 has a length of 250 mm±1 mm and a width of 10 mm±1 mm or, if it is a commercial product delivered as a roll, the width is that of the roll. The face 106 of the glass substrate 105 has a length of 190 mm and a width greater than or equal to 10 mm. The application conditions of the flexible support segment 7 on the face 106 are those recommended by the supplier of the fastening means 8, 9. This may, in particular, involve recommendations about the adhesive bonding conditions in the case of a layer of adhesive, in particular the pressure, duration and means of pressing; or recommendations about the anchoring conditions in the case of a mechanical anchoring means, in particular the shape and way of machining the relief pattern formed on the substrate.

In order to avoid any tensile elongation of the flexible support 7 during the test, it is provided with an aluminum strip 107. The strip 107 is fixed on the flexible support 7 with a layer of adhesive more rigid than the fastening means to be evaluated, so that the connection which fails during the test is that provided by the fastening means which is intended to be characterized. Furthermore, two reference lines are drawn on each test piece 103, as shown in FIG. 16, namely a first reference line $t_1$, 25 mm away from the end of the test piece, and a second reference line $t_2$, 140 mm away from the first reference line $t_1$. For each test piece 103, the test is carried out after resting for 22 hours in a room conditioned at 23° C.±2° C. and 50%±5% of relative humidity.

As can be seen in FIG. 14, the tensile testing machine 100 comprises a lower jaw 102 which is mobile with respect to the framework 101 of the machine, and an upper jaw 104 which is fixed with respect to the framework 101. The upper jaw 104 clamps one end of the flexible support segment 7. The displacement of the test piece 103 is slaved to the movement of the lower jaw 102 by a slaving cable 110 fixed to the substrate 105, so as to maintain a separation angle $\alpha$ of the order of 90°. The displacement speed of the lower jaw 102 is regulated to 100 mm/min±1 mm/min. The machine 100 is equipped with a recorder giving the variation of the force as a function of the displacement of the mobile lower jaw 102.

The operating mode for measuring the right-angle separation force of the fastening means 8, 9 with the aid of the tensile testing machine 100 is as follows.

First, a test piece 103 is introduced into the tensile testing machine 100 so as to obtain the arrangement shown in FIG. 14. To this end, a part of the flexible support segment 7 is separated from the test piece, without passing the second reference line $t_2$, and the end of the flexible support segment 7 is fixed in the upper jaw 104 until the limit of the separated region is in the axis of the jaw. The lower jaw 102 is then lowered, so as to obtain slight tensioning of the flexible support segment 7, then the slaving cable 110 is fixed to the substrate 105.

From this configuration, the tensile testing machine 100 is started with a speed of the lower jaw 102 of 100 mm/min±1 mm/min and the separation force in newtons is recorded as a function of the displacement of the lower jaw 102. For each test piece 103, the average separation force in newtons is determined over a length of 100 mm after removal of the portion of the force/displacement curve (displacement on the abscissa and force on the ordinate) corresponding to the first mm separated. The determination of the average separation force may be carried out either after smoothing of the curve, or by trying to graphically balance projecting and indented surfaces on either side of a parallel to the abscissa axis, the intersection of this parallel with the ordinate axis giving the average value of the separation force.

The average of the separation force values determined in this way over three test pieces 103 is then taken. The results are given by the average separation force, expressed in newtons per centimeter of width of the fastening means (N/cm). More precisely, for a layer of adhesive, the right-angle separation force is expressed in newtons per centimeter of width of the layer of adhesive. For a mechanical anchoring means which cooperates with a relief pattern, the right-angle separation force is expressed in newtons per centimeter of width of the relief pattern on the surface of the substrate. Thus, in the case of a mechanical anchoring means received with a force fit in a groove, the right-angle separation force is expressed in newtons per centimeter of width of the opening of the groove on the surface of the substrate.

According to one embodiment of the invention, the first fastening means is a first layer of adhesive arranged on the first external face of the support, and the second fastening means is a second layer of adhesive arranged on the second external face of the support, the right-angle peeling force of the first layer of adhesive, measured as described above on a glass panel with a mobile-jaw tensile testing machine with a 100 mm/min displacement speed of the mobile jaw, lying between 3 and 20 N/cm, preferably between 3 and 15 N/cm, while the right-angle peeling force of the second layer of adhesive, measured as described above on a glass panel with a mobile-jaw tensile testing machine with a 100 mm/min displacement speed of the mobile jaw, is greater than or equal to 30 N/cm.

According to one embodiment of the invention, the first fastening means is a mechanical anchoring means carried by the first external face of the support and capable of cooperating by shape complementarity with a relief pattern of a panel, and the second fastening means is a layer of adhesive arranged on the second external face of the support, the right-angle separation force of the mechanical anchoring means, measured as described above on a glass panel with a mobile-jaw tensile testing machine with a 100 mm/min displacement speed of the mobile jaw, lying between 3 and 20 N/cm, preferably between 3 and 15 N/cm, while the right-angle separation force of the layer of adhesive, measured as described above on a glass panel with a mobile-jaw tensile testing machine with a 100 mm/min displacement speed of the mobile jaw, is greater than or equal to 30 N/cm.

According to one characteristic, at least one of the first and second fastening means of the connecting joint is a mechanical anchoring means comprising a set of hollow(s) and protuberance(s) carried by the corresponding external face of the support, so that the support is capable of being received with a force fit in a groove of the panel.

According to one aspect of the invention, the connecting joint comprises a single support, the first fastening means arranged on the first external face of the support being intended to cooperate with a face of the first panel, while the second fastening means arranged on the second external face of the support is intended to cooperate with a face of the second panel.

According to one variant, the connecting joint comprises a first support and a second support, which have their first external faces facing one another and which are connected together by the first fastening means, the second fastening means arranged on the second external face of the first support being intended to cooperate with a face of the first panel, while the second fastening means arranged on the second external face of the second support is intended to cooperate with a face of the second panel.

According to another variant, the connecting joint comprises a first support and a second support, which have their second external faces facing one another and which are connected together by the second fastening means, the first fastening means arranged on the first external face of the first support being intended to cooperate with a face of the first panel, while the first fastening means arranged on the first external face of the second support is intended to cooperate with a face of the second panel.

According to one characteristic, the connecting joint is intended to cooperate with one edge of each panel, which makes it possible to assemble the panels end-to-end, in extension of one another. According to one variant, the connecting joint is intended to cooperate with an edge of one panel and a main face of the other panel, which makes it possible to assemble the panels transversely with respect to one another, forming a T or an L.

Advantageously, the or each support of the connecting joint consists of a polymer material. Preferably, the or each support of the connecting joint comprises at least one part consisting of transparent or translucent thermoplastic polymer, in particular thermoplastic elastomer (TPE). Examples of appropriate materials comprise: polyesters; polyolefins, in particular polyethylene, polypropylene, polybutylene; vinyl copolymers, in particular polyvinyl chloride, polyvinyl acetate; olefin copolymers, in particular ethylene-methacrylate copolymer, ethylene-vinyl acetate copolymer, ethylene-propylene copolymer; acrylonitrile-butadiene-styrene copolymers; acrylic polymers and copolymers; polyurethanes; and combinations or mixtures thereof. Appropriate mixtures comprise, for example, polypropylene/polyethylene mixtures; polyurethane/polyolefin mixtures; polyurethane/polycarbonate mixtures; polyurethane/polyester mixtures. Other appropriate mixtures comprise, for example, styrene-butadiene copolymers; polychloroprenes; nitrile rubbers; butyl rubbers; silicone rubbers; polyurethane rubbers; acrylate rubbers; natural rubbers; thermoplastic rubbers, in particular styrene block copolymers, ether-urethane block copolymers, ester-urethane block copolymers, ether-ester block copolymers, ether-amide block copolymers; and combinations thereof.

According to one advantageous characteristic, the or each support of the connecting joint consists of a self-extinguishing material having flame retardant and antifume properties, such as certain thermoplastic polymers, in particular TPE, so as to satisfy the requirements in force in the construction industry.

Preferably, the or each support of the connecting joint comprises at least one internal cavity. In particular, the or each support may comprise one or more volume cavities. As a variant, the or each support may comprise a plurality of internal microcavities, and in particular the or each support may be formed by a polymer foam. In these two cases, the presence of one or more internal cavities in the structure of each support imparts to the connecting joint deformation and energy absorption properties which are favorable for its use in a glazed wall. On the one hand, the connecting joint is capable of deforming in order to ensure continuous contact with the faces of the two panels between which it is arranged, even if there are irregularities on the faces of these panels. The connecting joint thus guarantees good sealing between the panels and forms an effective barrier against transmission of air and noise. Furthermore, the level of requirement for the manufacturing tolerances of the panels can be lowered. On the other hand, the connecting joint is capable of absorbing energy between the panels of the glazed wall, in particular impact energy, which makes it possible to avoid serial fractures of the panels, and vibrational energy, which makes it possible to improve the acoustic insulation performance of the glazed wall.

According to one characteristic, the or each support of the connecting joint has a quadrilateral cross section. The fastening means of the connecting joint may then be installed on two of the four external faces of the support. Advantageously, the support has a rectangular cross section with the smallest possible width, and the fastening means of the connecting joint are installed on the two faces forming the lengths of the rectangular cross section. Thus, the bulk of the connecting joint between two adjacent panels is restricted, which improves the esthetics and the transparency of the glazed wall.

As a variant, the or each support of the connecting joint has an at least partially convex cross section. The convex part of the support is then advantageously received in a groove formed in the panel, having a convex cross section substantially complementary to that of the support. Such an arrangement makes it possible to reduce the bulk of the connecting joint between the two adjacent panels, and thus to improve the esthetics and the transparency of the glazed wall.

Whatever the embodiment, the connecting joint is advantageously adapted so that the distance between the faces of the two adjacent panels is less than 5 mm, preferably of the order of 2 mm.

According to another variant, the or each support has a cross section in the shape of a diabolo. A diabolo cross section of the support is particularly advantageous when the connecting joint cooperates with the edges of the adjacent panels and these are chamfered. This is because the connecting joint can then match the entire surface of the two edges of the panels between which it is inserted.

According to another advantageous characteristic, the connecting joint fills the entire gap between the edges of the adjacent panels and is flush with the main faces of the panels. This flush arrangement of the connecting joint with the surface of the glazed wall contributes to the esthetics of the glazed wall and facilitates its maintenance, particularly in terms of cleaning, since the risk of dirt being deposited between the panels is eliminated.

In one embodiment, the connecting joint comprises a profiled section made of thermoplastic polymer, in particular polyvinyl chloride (PVC), comprising at least one internal volume cavity, which is coated on two of its external faces, respectively with a first double-sided adhesive tape and a second double-sided adhesive tape, the right-angle peeling force of the outwardly directed layer of adhesive of the first adhesive tape, measured as described above on a glass panel with a mobile-jaw tensile testing machine with a 100 mm/min displacement speed of the mobile jaw, lying between 3 and 20 N/cm, preferably between 3 and 15 N/cm, while the right-angle peeling force of the outwardly directed layer of adhesive of the second adhesive tape, measured as described above on a glass panel with a mobile-jaw tensile testing machine with a 100 mm/min displacement speed of the mobile jaw, is greater than or equal to 30 N/cm.

In this embodiment, the support of the connecting joint is therefore formed by a stack comprising the support of the first adhesive tape, the layer of adhesive of the first adhesive tape directed towards the profiled section made of thermoplastic polymer, the profiled section made of thermoplastic polymer, the layer of adhesive of the second adhesive tape directed towards the profiled section made of thermoplastic polymer, the support of the second adhesive tape. The supports of the adhesive tapes may, in particular, be made of polyester or of acrylic foam. Preferably, strong adhesion is obtained between each adhesive tape and the profiled section made of thermoplastic polymer with the aid of a layer of an adhesion primer between each adhesive tape and the corresponding external face of the profiled section. By way of example, when the profiled section is made of PVC, a layer of primer based on polyamide resin may be provided in order to improve the adhesion of the adhesive tapes on the external faces of the profiled section made of PVC. According to one characteristic, the profiled section made of thermoplastic polymer has a quadrilateral cross section and the first and second adhesive tapes are positioned on the two opposite external faces of the profiled section. According to one advantageous characteristic, the profiled section made of thermoplastic polymer of the connecting joint is an extruded profiled section.

According to one characteristic, the support of the connecting joint comprises inside it a strand of metal or another material resistant to elongation, which extends over the entire length of the support. In the embodiment described above, the strand may in particular be positioned inside the profiled section made of thermoplastic polymer. This strand improves the rigidity and resistance to elongation of the connecting joint. In particular, by virtue of the presence of this strand, it is possible to position the connecting joint on a face of a panel by applying a tensile force to the strand, for example in order to unroll it, without thereby causing overloading or stressing of the connecting joint, which would be capable of degrading the mechanical properties of the connecting joint once installed.

The invention also relates to a glazed wall comprising a first panel and a second panel, as well as a connecting joint as described above, which cooperates with a face of each panel.

Each panel of the glazed wall may be a single glazing formed by a single substrate. As a variant, each panel may be a laminated glazing or a multiple glazing comprising a plurality of substrates assembled together. According to one advantageous characteristic, for each panel of the glazed wall, the or each substrate of the panel is made of glass or rigid polymer, for example polycarbonate or polymethyl methacrylate.

According to one characteristic, at least one of the panels of the glazed wall comprises a groove, in particular formed in its edge, this groove having a cross section substantially complementary to that of a part of the support of the connecting joint. Advantageously, the complementary cross sections of the groove and of the support are at least partially convex.

According to another characteristic, one of the fastening means of the connecting joint is a mechanical anchoring means, and one of the panels of the glazed wall comprises a groove, in particular formed in its edge, which is adapted to receive the mechanical anchoring means with a force fit in its internal volume.

The invention also relates to a panel, in particular made of glass, comprising a connecting joint as described above on at least one of its faces, in particular on at least one of its edges, one of the first and second fastening means cooperating with the face of the panel, while the other of the first and second fastening means is available for connection to another panel. When the fastening means available for connection to another panel is a layer of adhesive, the latter is advantageously covered with a removable protective tape (liner).

Advantageously, a panel as described above, which is preassembled with at least one connecting joint, can be manufactured industrially without excessively modifying existing production lines for panels, in particular when it is a glass panel. This is because the integration of an additional module for installing the connecting joint on one of the faces of the panels at the end of the manufacturing line, after the modules for shaping the panels, is relatively easy. Furthermore, such a panel, provided on one of its faces with a connecting joint whose fastening means is available to cooperate with another panel, allows simple and rapid mounting of the glazed walls. This is because, starting with a batch of these panels preassembled with their connecting joint, it is sufficient to position the panels side-by-side while taking care, for each pair of successive panels, to place the face provided with the connecting joint of one panel facing a corresponding face of the second panel.

Preferably, in a panel as described above it is the second fastening means, which has the higher right-angle separation force, which cooperates with the face of the panel, while the first fastening means, which has the lower right-angle separation force, is available for connection to another panel. This limits the risk of separation of the connecting joint relative to the panel with which it is preassembled, since it is the fastening means with the higher separation force which cooperates with the panel.

The invention also relates to a method for mounting a glazed wall comprising at least two panels as described above, the method comprising steps in which:

- the panels are positioned in such a way that the face provided with the connecting joint of a first panel faces a corresponding face of the second panel;
- the two panels are secured by exerting a pressure force of the faces of the panels toward one another so as to activate the or each available fastening means.

In particular, in the case of panels which are provided with a connecting joint on only one of their edges, the panels of each pair of adjacent panels are positioned in such a way that the edge provided with the connecting joint of a first panel faces the corresponding free edge of the second panel. The two panels are then secured by pressing the available fastening means of the connecting joint carried by the first panel against the free edge of the second panel.

In the case of panels which are provided with a connecting joint on two opposite edges, the panels of each pair of adjacent panels are positioned in such a way that one edge provided with a connecting joint of a first panel faces one edge provided with a connecting joint of the second panel. The securing of the two panels is then carried out by pressing the available fastening means of the connecting joint carried by the first panel against the available fastening means of the connecting joint carried by the second panel.

The invention also relates to a method for installing a connecting joint as described above on a face of a panel, in which the connecting joint is placed opposite the face of the panel, with one out of the first fastening means and the second fastening means facing said face of the panel, and a force is exerted in order to press the connecting joint against the face of the panel, in a direction transverse to the face of the panel, so as to activate the fastening means which faces said face of the panel.

According to one aspect of the invention, the joint is placed progressively opposite the face of the panel, and the force exerted on the connecting joint in order to press it against the face of the panel is exerted locally on a segment of the connecting joint which has just been placed opposite the face of the panel. In this case, the same pressure force is preferably exerted over the entire length of the connecting joint.

In one embodiment, the connecting joint is wound on itself before it is installed on the face of the panel, the method then being such that the connecting joint is unrolled opposite the face of the panel and the pressure force is exerted locally on a segment of the connecting joint which has just been unrolled opposite the face of the panel.

When the fastening means which faces said face of the panel is a layer of adhesive covered with a removable protective tape (liner), the method comprises a prior step of removing the protective tape before the connecting joint is installed opposite the face of the panel.

The invention also relates to a tool for installing a connecting joint as described above on a face of a panel, comprising means for positioning the connecting joint opposite the face of the panel, with one out of the first fastening means and the second fastening means facing said face of the panel, and means for applying a force in order to press the connecting joint against the face of the panel, in a direction transverse to the face of the panel.

In one embodiment, in particular for installing a connecting joint which is wound on itself before it is installed on the face of the panel, the tool is such that:

- the positioning means are mobile means for progressive unrolling of the connecting joint opposite the face of the panel, and
- the means for applying the pressure force are kinematically linked to the positioning means and configured in order to exert a constant force on successive segments of the connecting joint, when they have just been unrolled opposite the face of the panel.

When the face of the panel is an edge of the panel, the means for positioning the tool advantageously comprise means for centering the connecting joint opposite the edge. The tool may also comprise means for removing a removable protective tape (liner) protecting the fastening means of the connecting joint.

The characteristics and advantages of the invention will become apparent in the following description of several embodiments of a connecting joint, a glazed wall and a panel according to the invention, which is given solely by way of example and made with reference to the appended drawings, in which:

FIG. 6 is a section similar to FIG. 2 for a fifth embodiment of the invention;

FIG. 6A is a section similar to FIG. 6 showing the securing of two panels;

FIG. 7 is a section similar to FIG. 2 for a sixth embodiment of the invention;

FIG. 7A is a section similar to FIG. 7 showing the securing of two panels;

FIG. 8 is a section similar to FIG. 2 for a seventh embodiment of the invention;

Figure 14:
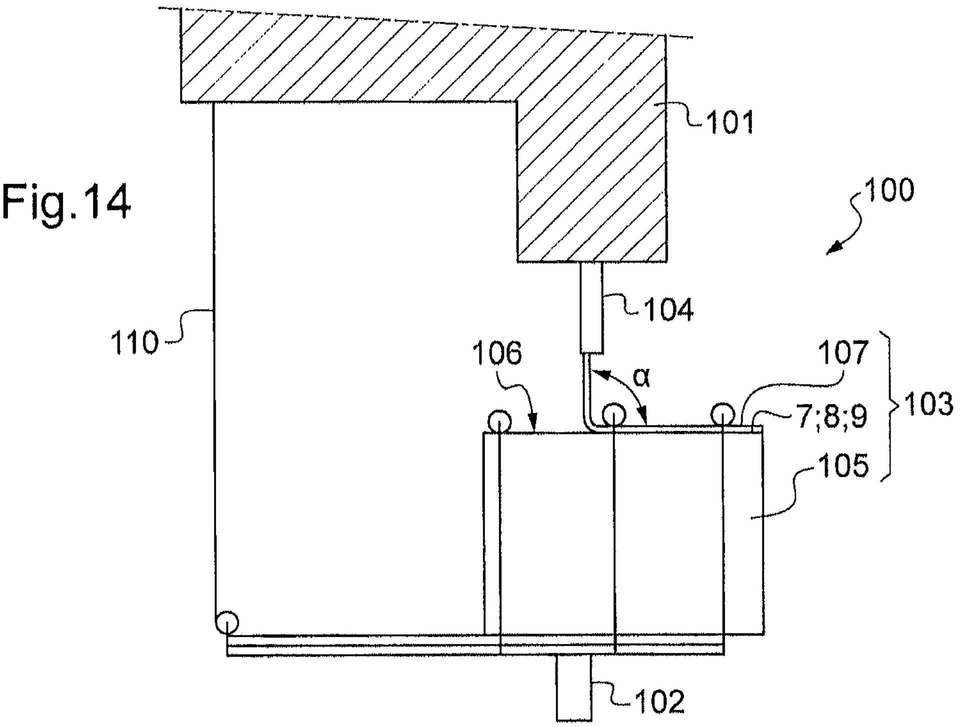
FIG. 14 is a schematic view of the arrangement used in the scope of the invention for measuring the right-angle separation force of a fastening means, the measurement being carried out on a glass panel with a mobile-jaw tensile testing machine.
Figure 15:
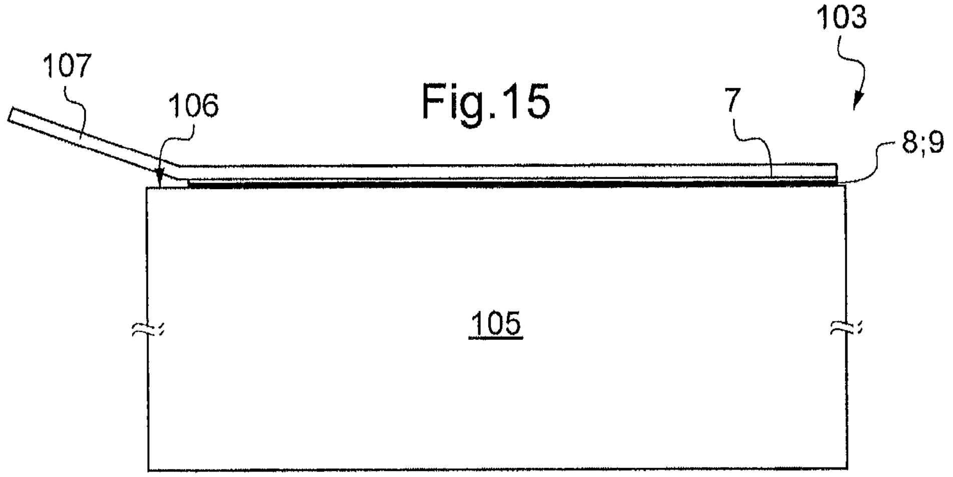
FIG. 15 is a view on an enlarged scale of the test piece used in the arrangement of FIG. 14.
Figure 16:
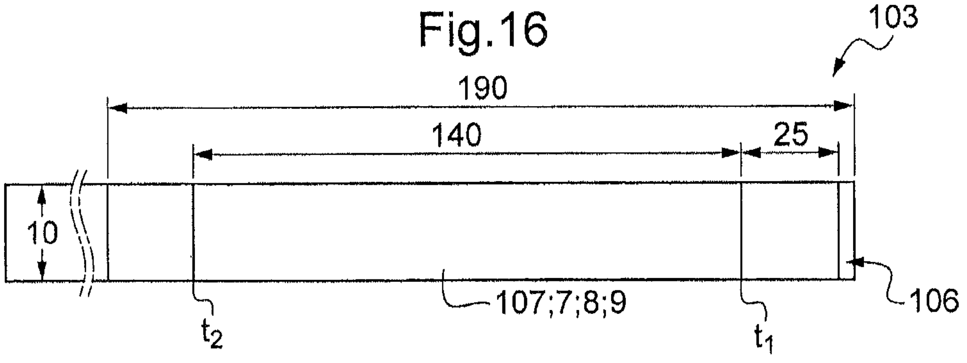
Figure 17:
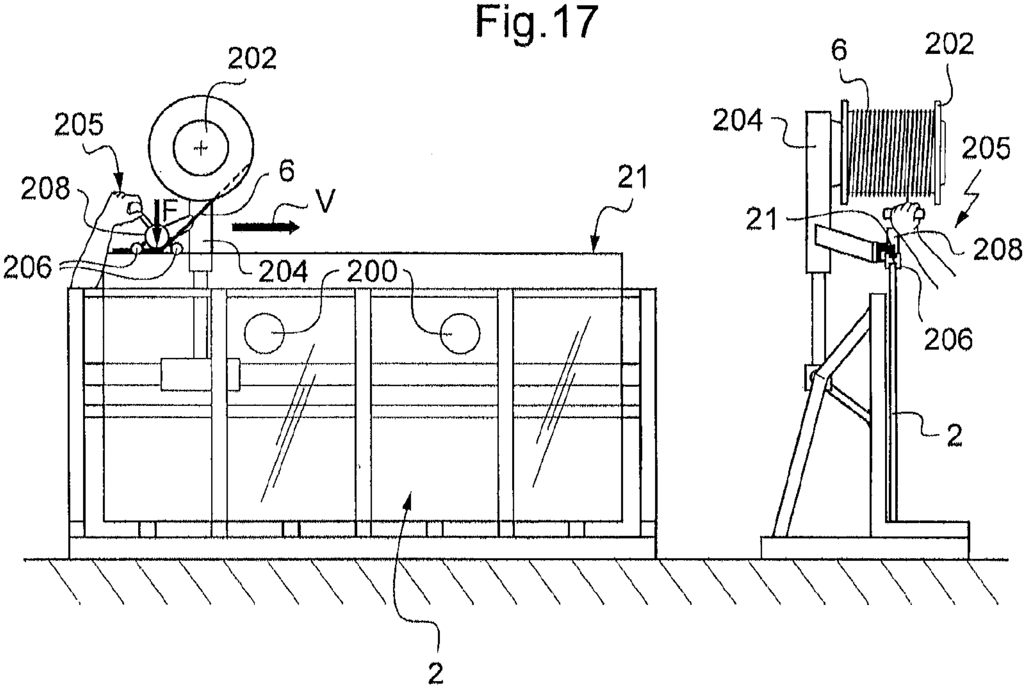

FIG. 16 is a view from above of the test piece of FIG. 14, showing reference lines which are used during the measurement; and FIG. 17 is a view in elevation showing a step of installing and a tool for installing a connecting joint according to the invention on the edge of a panel, comprising a view with the panel facing on the left of the figure and a view with the panel in profile on the right of the figure.

The views of FIGS. 1 to 16 are schematic. In particular, for the sake of clarity, the relative dimensions of the various elements have not been strictly respected in these figures.

Figure 1:
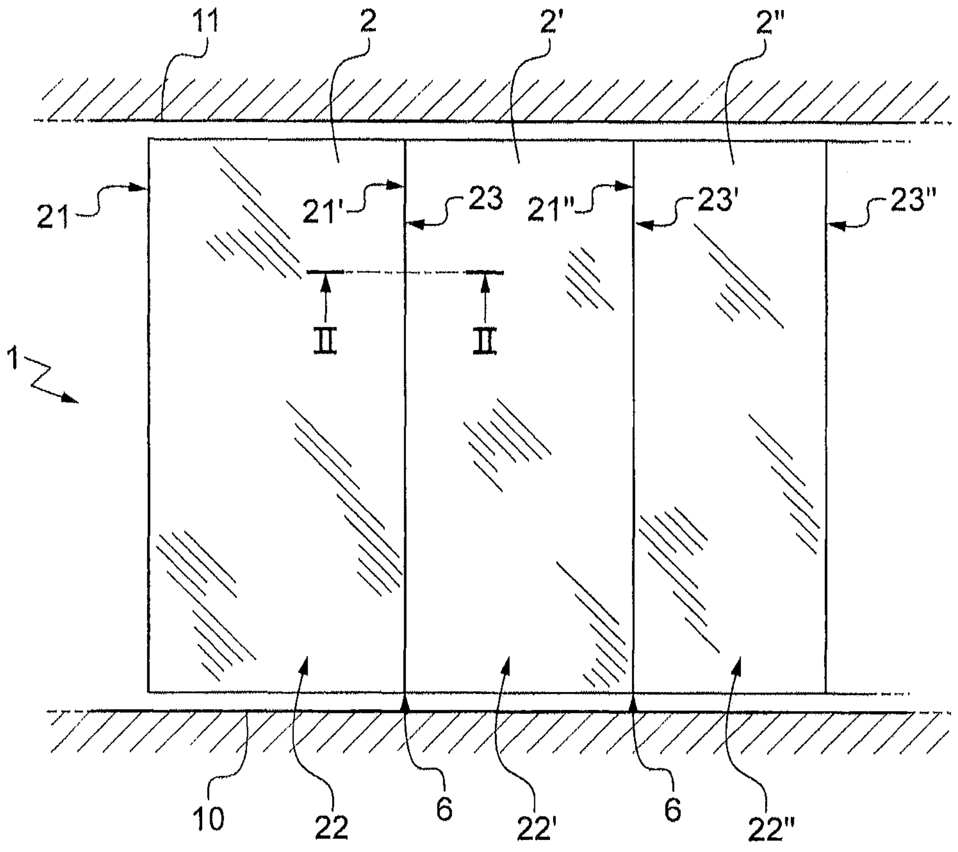
FIG. 1 is a view in elevation of a glazed wall according to the invention, comprising a plurality of transparent panels juxtaposed with one another and connected in pairs by a connecting joint according to a first embodiment of the invention.

The glazed wall 1 represented in FIG. 1 comprises a plurality of transparent panels 2, 2', 2", etc., juxtaposed with one another. By way of example, the glazed wall 1 is an interior partition of a room of a building, arranged between a floor 10 and a ceiling 11 of the room. In this example, each panel 2, 2', 2", etc., is formed by a monolithic pane of tempered glass with a rectangular shape, the longitudinal dimension of which corresponds substantially to the height of the room. The main faces are denoted by 22, 24, 22', 24', 22", 24" and the longitudinal edges of each panel 2, 2' or 2" are denoted by 21, 23, 21', 23', 21", 23". For each pair of adjacent panels, the two panels are abutted with their longitudinal edges opposite one another. In particular, the longitudinal edge 23 of the panel 2 is opposite the longitudinal edge 21' of the panel 2', while the longitudinal edge 23' of the panel 2' is opposite the longitudinal edge 21" of the panel 2". For each pair of adjacent panels, the glazed wall comprises a connecting joint 6 between the longitudinal edges of the two panels, which cooperates with each edge. Preferably, the connecting joint 6 extends substantially over the entire length of the longitudinal edges of the panels, so as effectively prevent transmission of air and noise.

The connecting joint 6 comprises at least one transparent or translucent support made of thermoplastic polymer, in particular thermoplastic elastomer (TPE), which is provided with a first fastening means 8 on a first external face and with a second fastening means 9 on a second external face. According to the invention, the right-angle separation force of the first fastening means lies between 3 and 15 N/cm, while the right-angle separation force of the second fastening means is greater than or equal to 30 N/cm. In each of the embodiments described below, the values of right-angle separation forces (or right-angle peeling forces in the case of a layer of adhesive) are given according to the measurement method described above with reference to FIGS. 14 to 16.

Figure 2:
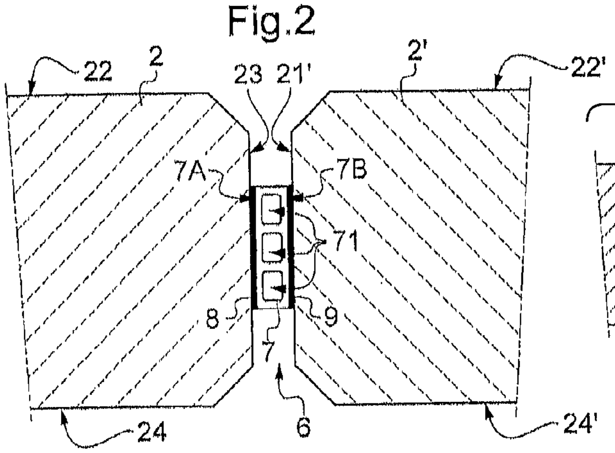
FIG. 2 is a section along the line II-II of FIG. 1.

In the first embodiment, represented in FIG. 2, the connecting joint 6 is a double-sided adhesive tape with a differential adhesive system, which comprises a single support 7 having a rectangular cross section and three internal volume cavities 71. The two external faces of the support 7, forming the lengths of the rectangular cross section, are denoted by 7A and 7B. The face 7A is coated with a layer of acrylic adhesive 8 having a right-angle peeling force of 7.0 N/cm, while the face 7B is coated with a layer of acrylic adhesive 9 having a right-angle peeling force of 36.7 N/cm. In the mounted state of the glazed partition 1, the layer of adhesive 8 cooperates with the edge 23 of the panel 2 and the layer of adhesive 9 cooperates with the edge 21' of the panel 2'.

Figure 2A:
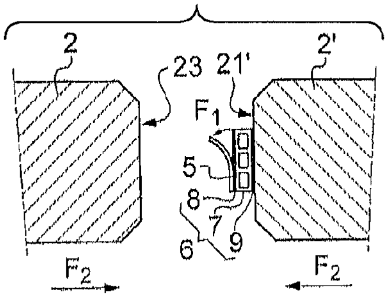
FIG. 2A is a section similar to FIG. 2, showing the securing of two panels.

FIG. 2A shows the securing of the panels 2, 2' during assembly of the glazed wall 1. As shown in this figure, the panel 2' is initially preassembled with the connecting joint 6 on its edge 21', while the panel 2 is without a connecting joint on its edge 23. Preferably, the panels 2, 2', 2'', etc., of the glazed wall 1 are all initially preassembled with a connecting joint 6 on their edge 21, 21', 21'', etc., and without a connecting joint on their edge 23, 23', 23'', etc. For each panel 2, 2', 2'', etc., the layer of adhesive 9 with the higher right-angle peeling force cooperates with the edge 21, 21', 21'', etc., of the panel, while the layer of adhesive 8 with the lower right-angle peeling force is covered with a removable protective tape 5 and is available for connection to another panel. The mounting of the glazed wall 1 is obtained by positioning the panels 2 and 2' in such a way that the edge 21' of the panel 2' which is provided with the connecting joint 6 is opposite the free edge 23 of the panel 2, then, after the protective tape 5 has been removed as shown by the arrow $F_1$ of FIG. 2A, by exerting a pressure force $F_2$ of the edges 23 and 21' toward one another, so as to activate the layer of adhesive 8.

By virtue of the relatively low peeling force of the layer of adhesive 8 of each connecting joint 6, it is possible to reposition the panels with respect to one another during mounting of the glazed wall 1. Furthermore, once the glazed wall 1 is mounted, it is easy to extract an intermediate panel without having to dismantle the entire wall. Owing to the higher peeling force of the layer of adhesive 9 in relation to the layer of adhesive 8, the connecting joint 6 of each panel is fixed strongly to the edge 21, 21', 21'', etc., of the panel and remains secured to this edge during dismantling of the glazed wall 1.

Figure 3:
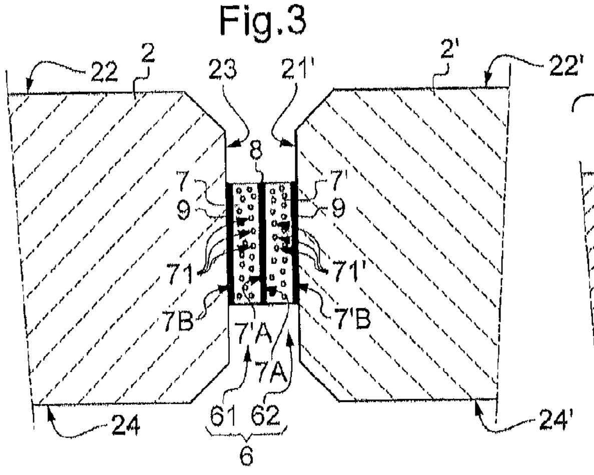
FIG. 3 is a section similar to FIG. 2 for a second embodiment of the invention.

In the second embodiment, represented in FIG. 3, the connecting joint 6 comprises two supports 7 and 7', both of which have the same rectangular cross section and a foamed structure comprising a plurality of microcavities 71, 71'. The two external faces of the support 7, forming the lengths of the rectangular cross section, are denoted by 7A and 7B, and the two similar faces of the support 7' are denoted by 7'A and 7'B. The supports 7 and 7' have their faces 7A and 7'A opposite one another and are connected together at these faces by a layer of acrylic adhesive 8 having a right-angle peeling force of 7.0 N/cm. The faces 7B and 7'B of the supports 7 and 7' are each coated with a layer of acrylic adhesive 9 having a right-angle peeling force of 36.7 N/cm. In the mounted state of the glazed partition 1, the layer of adhesive 9 carried by the external face 7B of the support 7 cooperates with the edge 23 of the panel 2, and the layer of adhesive 9 carried by the external face 7'B of the support 7' cooperates with the edge 21' of the panel 2'.

Figure 3A:
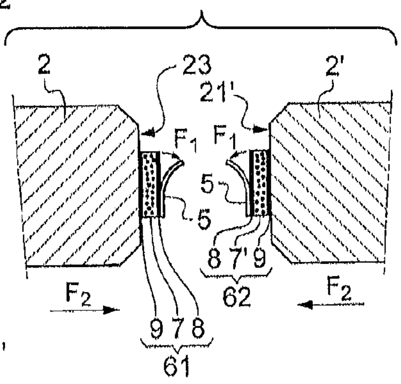
FIG. 3A is a section similar to FIG. 3 showing the securing of two panels.

FIG. 3A shows the securing of the panels 2, 2' during assembly of the glazed wall 1. The panel 2 is initially preassembled, on its edge 23, with a part 61 of the connecting joint, which part is formed by the support 7 coated with layers of adhesive 8 and 9, the layer of adhesive 9 with the higher right-angle peeling force cooperating with the edge 23 of the panel, while the layer of adhesive 8 with the lower right-angle peeling force is covered with a removable protective tape 5. Symmetrically, the panel 2' is initially preassembled, on its edge 21', with a part 62 of the connecting joint, which part is formed by the support 7' coated with layers of adhesive 8 and 9, the layer of adhesive 9 with the higher right-angle peeling force cooperating with the edge 21' of the panel, while the layer of adhesive 8 with the lower right-angle peeling force is covered with a removable protective tape 5. Of course, as a variant it is conceivable for only one part 61 or of the connecting joint to comprise a layer of adhesive 8, while the other part 62 or 61 is without a layer of adhesive 8. The mounting of the glazed wall 1 is obtained by positioning the panels 2 and 2' in such a way that the edge 23 of the panel 2 is opposite the edge 21' of the panel 2', then, after the protective tape or tapes 5 has been removed as shown by the arrows $F_1$ of FIG. 3A, by exerting a pressure force $F_2$ of the edges 23 and 21' toward one another, so as to activate the layer or layers of adhesive 8 and secure the supports 7 and 7' on their faces 7A and 7'A.

Figure 4:
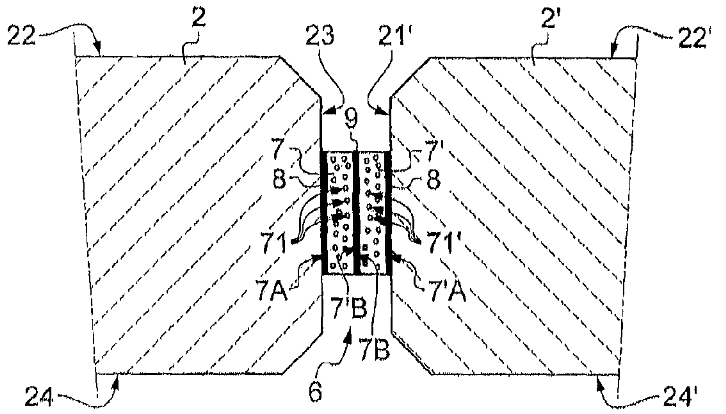
FIG. 4 is a section similar to FIG. 2 for a third embodiment of the invention.

The third embodiment, represented in FIG. 4, differs from the second embodiment of FIG. 3 in that the supports 7 and 7' are connected together on their opposite faces 7B and 7'B by a layer of acrylic adhesive 9 having a right-angle peeling force of 36.7 N/cm, while the faces 7A and 7'A of the supports 7 and 7' are each coated with a layer of acrylic adhesive 8 having a right-angle peeling force of 7.0 N/cm, which cooperates with an edge of a panel. In the mounted state of the glazed partition 1, the layer of adhesive 8 carried by the external face 7A of the support 7 cooperates with the edge 23 of the panel 2, and the layer of adhesive 8 carried by the external face 7'A of the support 7' cooperates with the edge 21' of the panel 2'. The securing of the panels 2 and 2' during assembly of the glazed wall 1 has not been represented for this third embodiment, given that it is carried out in a way similar to that described with reference to FIG. 3A, with a different location of the layers of adhesive 8 and 9 with lower and higher right-angle peeling forces.

Figure 5:
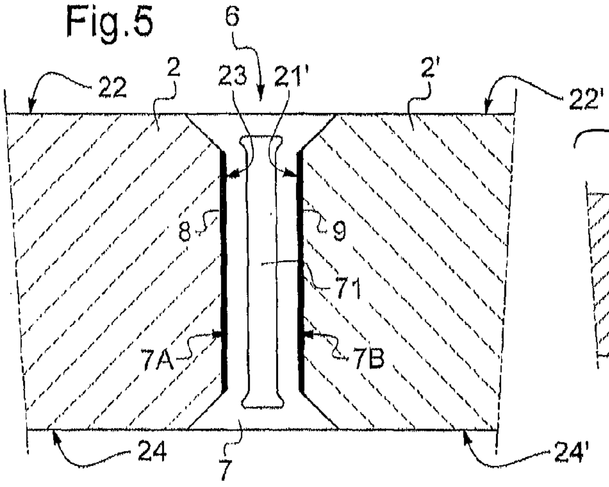
FIG. 5 is a section similar to FIG. 2 for a fourth embodiment of the invention.
Figure 5A:
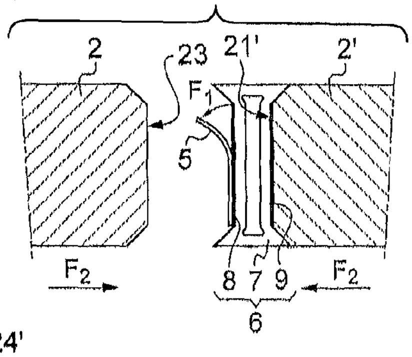
FIG. 5A is a section similar to FIG. 5 showing the securing of two panels

In the fourth embodiment, represented in FIG. 5, the connecting joint 6 comprises a single support 7 having a cross section in the shape of a diabolo and an internal volume cavity 71. The external faces of the support 7 forming the intermediate part between the two recessed parts of the diabolo are denoted by 7A and 7B. The face 7A is coated with a layer of acrylic adhesive 8 having a right-angle peeling force of 7.0 N/cm, while the face 7B is coated with a layer of acrylic adhesive 9 having a right-angle peeling force of 36.7 N/cm. In the mounted state of the glazed partition 1, the layer of adhesive 8 cooperates with the edge 23 of the panel 2 and the layer of adhesive 9 cooperates with the edge 21' of the panel 2'. By virtue of its diabolo cross section complementary to the chamfered edges 23 and 21', the connecting joint 6 perfectly matches the surface of the two edges 23 and 21' and fills the entire gap between the panels 2 and 2'. Advantageously, the connecting joint is flush with the main faces 22, 24 and 22', 24' of the panels 2 and 2'. As shown in FIG. 5A, the securing of the panels 2 and 2' during assembly of the glazed wall 1 is carried out in a way similar to that described with reference to FIG. 2A.

In the fifth embodiment, represented in FIG. 6, the connecting joint 6 comprises a single support 7 having a circular cross section and two internal volume cavities 71. Two diametrically opposite external faces of the support 7 are denoted by 7A and 7B. The face 7A is coated with a layer of acrylic adhesive 8 having a right-angle peeling force of 7.0 N/cm, while the face 7B is coated with a layer of acrylic adhesive 9 having a right-angle peeling force of 36.7 N/cm. In this embodiment, each of the edges 23 and 21' of the panels 2, 2' is provided with a longitudinal groove, respectively denoted by 25 and 25', which has a convex cross section substantially complementary to the profile of each face 7A and 7B of the support. Each groove 25 and 25' is formed in a central portion of the longitudinal edge 23, 21', so that it is bordered on either side by two remaining surface portions of the edge 23, 21'. In the mounted state of the glazed partition 1, the support 7 is received in the groove 25 of the edge 23 on its face 7A, and in the groove 25' of the edge 21' on its face 7B. The layer of adhesive 8 then cooperates with the groove 25 formed in the edge of the panel 2, while the layer of adhesive 9 cooperates with the groove 25' formed in the edge 21' of the panel 2'.

FIG. 6A shows the securing of the panels 2 and 2' during assembly of the glazed wall 1. As shown in this figure, the panel 2' is initially preassembled with the connecting joint 6, which is received in the groove 25' of the edge 21', while the panel 2 is without a connecting joint on its edge 23. Preferably, the panels 2, 2', 2", etc., of the glazed wall 1 are all initially preassembled with a connecting joint 6 on their edge 21, 21', 21", etc., and without a connecting joint on their edge 23, 23', 23", etc. For each panel 2, 2', 2", etc., the layer of adhesive 9 with the higher right-angle peeling force cooperates with the groove formed in the edge 21, 21', 21", etc., of the panel, while the layer of adhesive 8 with the lower right-angle peeling is covered with a removable protective tape 5 and is available for connection to another panel. The mounting of the glazed wall 1 is obtained by positioning the panels 2 and 2' in such a way that the edge 21' of the panel 2' which is provided with the connecting joint 6 is opposite the free edge 23 of the panel 2, then, after the protective tape 5 has been removed as shown by the arrow $F_1$ of FIG. 6A, by exerting a pressure force $F_2$ of the edges 23 and 21' toward one another, so as to insert the support 7 of the connecting joint into the groove 25 formed in the edge 23 of the panel 2 and activate the layer of adhesive 8.

In the sixth embodiment, represented in FIG. 7, the connecting joint 6 comprises two supports 7 and 7', both of which have the same semicircular or planoconvex cross section, and an internal volume cavity respectively denoted by 71 and 71'. The external face of the support 7 forming the plane side of the semicircular cross section is denoted by 7A, and the external face of the support 7 forming the convex side of the semicircular cross section is denoted by 7B. In the same way, the similar faces of the support 7' are denoted by 7'A, 7'B. The supports 7 and 7' have their plane faces 7A and 7'A opposite one another and are connected together on their plane faces by a layer of acrylic adhesive 8 having a right-angle peeling force of 7.0 N/cm. The convex faces 7B and 7'B of the supports 7 and 7' are each coated with a layer of acrylic adhesive 9 having a right-angle peeling force of 36.7 N/cm. As in the previous embodiment, each of the edges 23 and 21' of the panels 2, 2' is provided with a longitudinal groove, respectively denoted by 25 and 25', which has a convex cross section substantially complementary to the profile of each convex face 7B and 7'B of the supports 7 and 7'. In the mounted state of the glazed partition 1, the support 7 is received in the groove 25 of the edge 23 on its face 7B, and the support 7' is received in the groove 25' of the edge 21' on its face 7'B. The layer of adhesive 9 carried by the external face 7B of the support 7 then cooperates with the groove 25 formed in the edge 23 of the panel 2, while the layer of adhesive 9 carried by the external face 7'B of the support 7' cooperates with the groove 25' formed in the edge 21' of the panel 2'.

FIG. 7A shows the securing of the panels 2 and 2' during assembly of the glazed wall 1. The panel 2 is initially preassembled, on its edge 23, with a part 61 of the connecting joint, which part is formed by the support 7 coated with layers of adhesive 8 and 9, the layer of adhesive 9 with the higher right-angle peeling force cooperating with the edge 23 of the panel, while the layer of adhesive 8 with the lower right-angle peeling force is covered with a removable protective tape 5. Symmetrically, The panel 2' is initially preassembled, on its edge 21', with a part 62 of the connecting joint, which part is formed by the support 7' coated with layers of adhesive 8 and 9, the layer of adhesive 9 with the higher right-angle peeling force cooperating with the edge 21' of the panel, while the layer of adhesive 8 with the lower right-angle peeling force is covered with a removable protective tape 5. Of course, as a variant it is conceivable for only one part 61 or 62 of the connecting joint to comprise a layer of adhesive 8, while the other part 62 or 61 is without a layer of adhesive 8. The mounting of the glazed wall 1 is obtained by positioning the panels 2 and 2' in such a way that the edge 23 of the panel 2 is opposite the edge 21' of the panel 2', then, after the protective tape or tapes 5 has been removed as shown by the arrows $F_1$ of FIG. 7A, by exerting a pressure force $F_2$ of the edges 23 and 21' toward one another, so as to activate the layer or layers of adhesive 8 and secure the supports 7 and 7' on their faces 7A and 7'A.

The seventh embodiment, represented in FIG. 8, differs from the sixth embodiment of FIG. 7 in that the supports 7 and 7' are connected together, on their opposite plane faces which are denoted by 7B and 7'B, by a layer of acrylic adhesive 9 having a right-angle peeling force of 36.7 N/cm, while the convex faces of the supports 7 and 7', which are denoted by 7A and 7'A, are each coated with a layer of acrylic adhesive 8 having a right-angle peeling force of 7.0 N/cm. In the mounted state of the glazed partition 1, the support 7 is received in the groove 25 of the edge 23 on its face 7A, and the support 7' is received in the groove 25' of the edge 21' on its face 7'A. The layer of adhesive 8 carried by the external face 7A of the support 7 then cooperates with the groove 25 formed in the edge 23 of the panel 2, while the layer of adhesive 8 carried by the external face 7'A of the support 7' cooperates with the groove 25' formed in the edge 21' of the panel 2'. The securing of the panels 2 and 2' during assembly of the glazed wall 1 has not been represented for this seventh embodiment, given that it is carried out in a way similar to that described with reference to FIG. 7A, with a different location of the layers of adhesive 8 and 9 with lower and higher right-angle peeling forces.

Figure 9:
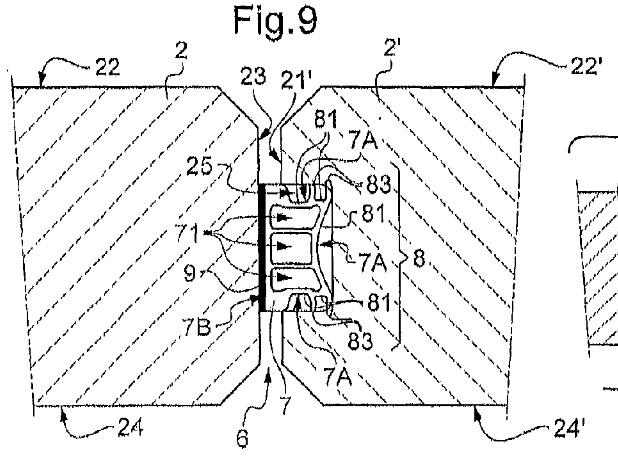
FIG. 9 is a section similar to FIG. 2 for an eighth embodiment of the invention.

In the eighth embodiment, represented in FIG. 9, the connecting joint 6 comprises a single support 7 having a substantially rectangular cross section and three internal volume cavities 71. One of the two external faces of the support 7 forming the lengths of the rectangular cross section is denoted by 7B, and the external face formed by the rest of the external surface of the support 7 is denoted by 7A. The face 7B is coated with a layer of acrylic adhesive 9 having a right-angle peeling force of 36.7 N/cm, while the face 7A carries a mechanical anchoring means 8 formed by a set of hollows 81 and protuberances 83 in the form of lips. In this embodiment, the edge 21' of the panel 2' is provided with a longitudinal groove 25', which has a rectangular cross section adapted to receive with a force fit the support 7 with its face 7B which is exposed through the longitudinal opening of the groove 25'. The anchoring means 8 and the groove 25' are dimensioned in such a way that the right-angle separation force is less than or equal to 15 N/cm. In the mounted state of the glazed partition 1, the layer of adhesive 9 cooperates with the edge 23 of the panel 2 and the anchoring means 8 cooperates with the groove 25' formed in the edge 21' of the panel 2'.

Figure 9A:
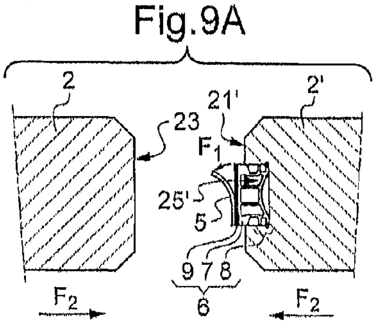
FIG. 9A is a section similar to FIG. 9 showing the securing of two panels.

FIG. 9A shows the securing of the panels 2 and 2' during assembly of the glazed wall 1. As shown in this figure, the panel 2' is initially preassembled with the connecting joint 6 on its edge 21', while the panel 2 is without a connecting joint on its edge 23. Preferably, the panels 2, 2', 2", etc., of the glazed wall 1 are all initially preassembled with a connecting joint 6 on their edge 21, 21', 21", etc., and without a connecting joint on their edge 23, 23', 23", etc. For each panel 2, 2', 2", etc., the anchoring means 8 cooperates with the groove formed in the edge 21, 21', 21", etc., of the panel, while the layer of adhesive 9 is covered with a removable protective tape 5 and is available for connection to another panel. The mounting of the glazed wall 1 is obtained by positioning the panels 2 and 2' in such a way that the edge 21' of the panel 2' which is provided with the connecting joint 6 is opposite the free edge 23 of the panel 2, then, after the protective tape 5 has been removed as shown by the arrow $F_1$ of FIG. 9A, by exerting a pressure force $F_2$ of the edges 23 and 21' toward one another, so as to activate the layer of adhesive 9.

Figure 10:
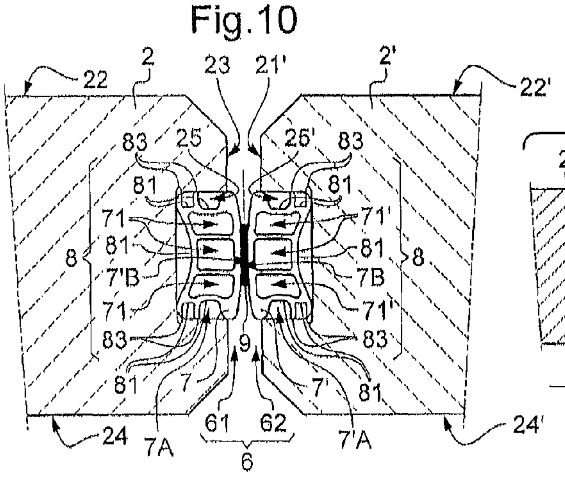
FIG. 10 is a section similar to FIG. 2 for a ninth embodiment of the invention.

In the ninth embodiment, represented in FIG. 10, the connecting joint 2 comprises two supports 7 and 7', which both have the same substantially rectangular cross section and three internal volume cavities, respectively denoted by 71 for the support 7 and 71' for the support 7'. One of the two external faces of the support 7 forming the lengths of the rectangular cross section is denoted by 7B, and the external face formed by the rest of the external surface of the support 7 is denoted by 7A. In the same way, the similar faces of the support 7' are denoted by 7'B, 7'A. The supports 7 and 7' have their faces 7B and 7'B opposite one another and are connected together on these faces by a layer of acrylic adhesive 9 having a right-angle peeling force of 36.7 N/cm. The faces 7A and 7'A of the supports 7 and 7' each carry a mechanical anchoring means 8 formed by a set of hollows 81 and protuberances 83 in the form of lips. In this embodiment, each of the edges 23 and 21' of the panels 2, 2' is provided with a longitudinal groove, respectively denoted by 25 and 25'. The groove 25 has a rectangular cross section adapted to receive with a force fit the support 7 with its face 7B which is exposed through the longitudinal opening of the groove 25. The anchoring means 8 and the groove 25 are dimensioned in such a way that the right-angle separation force is less than or equal to 15 N/cm. Similarly, the groove 25' has a rectangular cross section adapted to receive with a force fit the support 7' with its face 7'B which is exposed through the opening of the groove 25'. The anchoring means 8 and the groove 25' are dimensioned in such a way that the right-angle separation force is less than or equal to 15 N/cm. In the mounted state of the glazed partition 1, the support 7 is received in the groove 25 formed in the edge 23 of the panel 2, while the support 7' is received in the groove 25' formed in the edge 21' of the panel 2', so that its anchoring means 8 cooperates with the groove 25'.

Figure 10A:
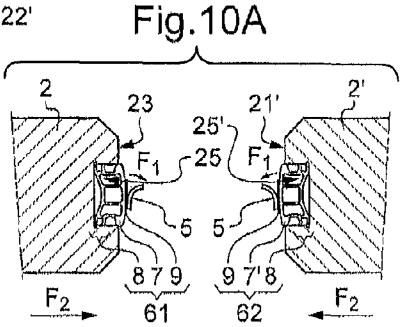
FIG. 10A is a section similar to FIG. 10 showing the securing of two panels.

FIG. 10A shows the securing of the panels 2 and 2' during assembly of the glazed wall 1. The panel 2 is initially preassembled, on its edge 23, with a part 61 of the connecting joint, which part is formed by the support 7 comprising the anchoring means 8 on its face 7A and a layer of adhesive 9 on its face 7B, which layer is covered with a removable protective tape 5. Symmetrically, the panel 2' is initially preassembled, on its edge 21', with a part 62 of the connecting joint, which part is formed by the support 7' comprising the anchoring means 8 on its face 7A and a layer of adhesive 9 on its face 7B, which layer is covered with a removable protective tape 5. Of course, as a variant it is conceivable for only one part 61 or of the connecting joint to comprise a layer of adhesive 9, while the other part 62 or 61 is without a layer of adhesive 9. The mounting of the glazed wall 1 is obtained by positioning the panels 2 and 2' in such a way that the edge 23 of the panel 2 is opposite the edge 21' of the panel 2', then, after the protective tape or tapes 5 has been removed as shown by the arrows $F_1$ of FIG. 10A, by exerting a pressure force $F_2$ of the edges 23 and 21' toward one another, so as to activate the layer or layers of adhesive 8 and secure the supports 7 and 7' on their faces 7B and 7'B.

Figure 11:
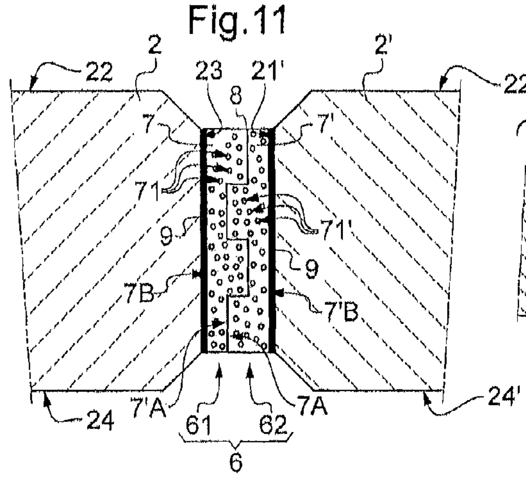
FIG. 11 is a section similar to FIG. 2 for a tenth embodiment of the invention.
Figure 11A:
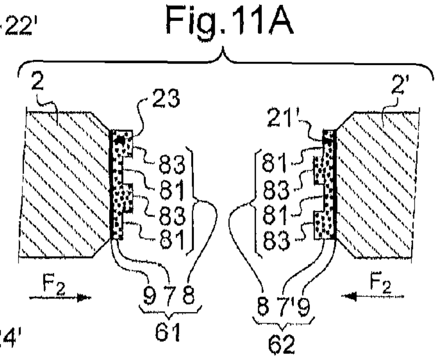
FIG. 11A is a section similar to FIG. 11 showing the securing of two panels.

In the tenth embodiment, represented in FIG. 11, the connecting joint 6 comprises two supports 7 and 7', both of which have the same substantially rectangular cross section and a foamed structure comprising a plurality of microcavities 71, 71'. The two external faces of the support 7, forming the lengths of the rectangular cross section, are denoted by 7A and 7B, and the two similar faces of the support 7' are denoted by 7'A and 7'B. The supports 7 and 7' have their faces 7A and 7'A opposite one another and are connected together at these faces by a mechanical anchoring means of the notched type. More precisely, the face 7*a* of the support 7 carries a set of hollows 81 and protuberances 83, which is capable of cooperating by shape complementarity with a set of protuberances 83 and hollows 81 of the face 7'A of the support 7'. The right-angle separation force of the anchoring means 8 is less than or equal to 15 N/cm. For their part, the faces 7B and 7'B of the supports 7 and 7' are each coated with a layer of acrylic adhesive 9 having a right-angle peeling force of 36.7 N/cm. In the mounted state of the glazed partition 1, the layer of adhesive carried by the external face 7B of the support 7 cooperates with the edge 23 of the panel 2, and the layer of adhesive 9 carried by the external face 7'B of the support 7' cooperates with the edge 21' of the panel 2'.

Figure 12:
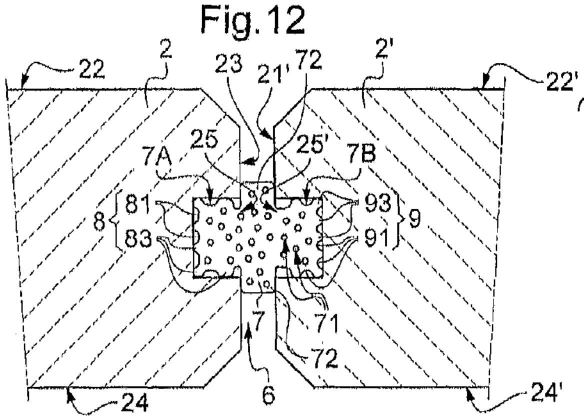
FIG. 12 is a section similar to FIG. 2 for an eleventh embodiment of the invention.
Figure 12A:
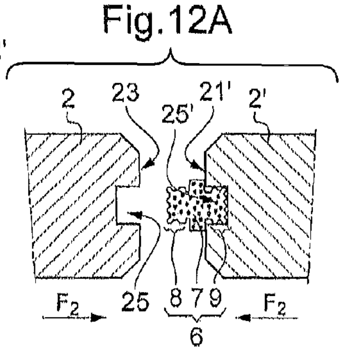
FIG. 12A is a section similar to FIG. 12 showing the securing of two panels.

In the eleventh embodiment, represented in FIG. 12, the connecting joint 6 comprises a single support 7 having a foamed structure comprising a plurality of microcavities 71. The support 7 has a cross-shaped cross section, of which two opposite branches 72 are intended to be used as spacers between the panels 2, 2'. The external face of the support 7 in each of the other two branches of the cross-shaped cross section is respectively denoted by 7A, 7B. The face 7A comprises a first mechanical anchoring means 8 formed by a set of hollows 81 and protuberances 83 and the face 7B comprises a second mechanical anchoring means 9, which means formed by a set of hollows 91 and protuberances 93. In this embodiment, each of the edges 23 and 21' of the panels 2, 2' is provided with a longitudinal groove, respectively denoted by 25 and 25'. The groove 25 has a rectangular cross section adapted to receive with a force fit the face 7A of the support 7 which carries the first anchoring means 8. The first anchoring means 8 and the groove 25 are dimensioned in such a way that the right-angle separation force is less than or equal to 15 N/cm. Similarly, the groove 25' has a rectangular cross section adapted to receive with a force fit the face 7B of the support 7 which carries the second anchoring means 9. The second anchoring means 9 and the groove 25' are dimensioned in such a way that the right-angle separation force is greater than or equal to 30 N/cm. In the mounted state of the glazed partition 1, the support 7 is received both in the groove 25 of the panel 2 and in the groove 25' of the panel 2', so that the first anchoring means 8 cooperates with the groove 25' and the second anchoring means 9 cooperates with the groove 25'.

Figure 13:
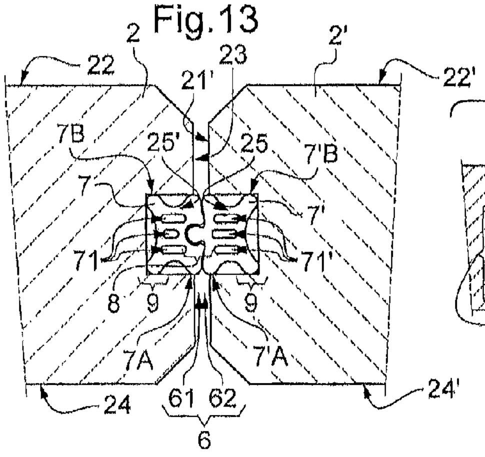
FIG. 13 is a section similar to FIG. 2 for a twelfth embodiment of the invention.
Figure 13A:
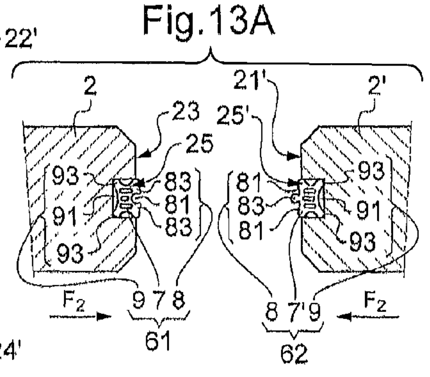
FIG. 13A is a section similar to FIG. 13 showing the securing of two panels.

In the twelfth embodiment, represented in FIG. 13, the connecting joint 6 comprises two supports 7 and 7', both of which have a substantially quadrilateral cross section and three internal volume cavities, respectively denoted by 71 for the support 7 and 71' for the support 7'. The external face of the support 7 in the vicinity of one side of the quadrilateral cross section is denoted by 7A, and the external face formed by the rest of the external surface of the support 7 is denoted by 7B. In the same way, the similar faces of the support 7' are denoted by 7'B, 7'A. The supports 7 and 7' have their faces 7A and 7'A opposite one another and are connected together on these faces by a mechanical anchoring means 8. More precisely, the face 7A of the support 7 carries a hollow 81 which is capable of cooperating by shape complementarity with a protuberance 83 of the face 7'A of the support 7'. The right-angle separation force of the anchoring means 8 is less than or equal to 15 N/cm. The faces 7B and 7'B of the supports 7 and 7' each carry a mechanical anchoring means 9 formed by a set of hollows 91 and protuberances 93 in the form of lips. In this embodiment, each of the edges 23 and 21' of the panels 2, 2' is provided with a longitudinal groove, respectively denoted by 25 and 25'. The groove 25 has a rectangular cross section adapted to receive with a force fit the support 7 with its face 7A which is exposed through the longitudinal opening of the groove 25. The anchoring means 9 and the groove 25 are dimensioned in such a way that the right-angle separation force is greater than or equal to 30 N/cm. Similarly, the groove 25' has a rectangular cross section adapted to receive with a force fit the support 7' with its face 7'A which is exposed through the longitudinal opening of the groove 25'. The anchoring means 9 and the groove 25' are dimensioned in such a way that the right-angle separation force is greater than or equal to 30 N/cm. In the mounted state of the glazed partition 1, the support 7 is received in the groove 25 formed in the edge 23 of the panel 2, so that its anchoring means 9 cooperates with the groove 25, while the support 7' is received in the groove 25' formed in the edge 21' of the panel 2', so that its anchoring means 9 cooperates with the groove 25'.

FIG. 17 illustrates an example of a method and a tool for installing a connecting joint 6 according to the invention. In this figure, a glass panel 2 is held vertically by a gripping device comprising suckers 200. In the example represented, the connecting joint 6 is placed on an edge 21 of the panel. The connecting joint is initially wound on itself, around a spool 202 positioned above the edge 21 of the panel. The spool 202 is secured to a chassis 204, which also carries an element 205 intended to slide along, the edge 21 of the panel, for example by being actuated manually. Means for automatic actuation of the sliding of the element 205 may also be provided.

The element 205 comprises two pairs of rollers 206 for positioning the connecting joint 6 opposite the edge 21 of the panel, with one out of the first fastening means and the second fastening means facing the edge 21, these rollers 206 ensuring guidance and centering of the connecting joint 6 with respect to the edge 21. The element 205 also comprises a roller 208 for applying a force F in order to press the connecting joint 6 against the edge 21 of the panel, in a direction substantially right-angle to the edge 21. The assembly comprising the spool 202, the chassis 204 and the element 205 is mobile and intended to be displaced along the panel 2, as shown by the arrow V of FIG. 17, so as to make the element 205 slide along the edge 21 of the panel and thus apply the connecting joint 6 progressively along the edge 21. In the course of the displacement V, the connecting joint 6 is unwound from the spool 202. The roller 208 exerts the force F locally on the segment of the connecting joint 6 which has just been unwound opposite the edge 21, this force F being kept constant during the displacement V.

When the fastening means of the connecting joint 6, intended to cooperate with the edge 21, is a layer of adhesive initially protected by a removable protective tape (liner), the installation may also comprise a device for removing the protective tape, this removal device (not represented) then acting on the connecting joint 6 between the spool 202 and the element 205.

The invention is not limited to the examples described and represented.

In particular, the panels 2, 2', 2", etc., may be of any shape other than rectangular and of any type other than a monolithic pane of tempered glass. In particular, the glass may be replaced with a rigid polymer, such as polycarbonate or polymethyl methacrylate. Each panel may also be laminated or multiple glazing comprising a plurality of substrates made of glass or rigid polymer. For connection between the laminated glazings, each comprising at least two substrates assembled by means of a polymer laminating insert, for example based on polyvinyl butyral (PVB), or between multiple glazings each comprising at least two substrates separated by a gas layer and assembled on their edges by a flat strip, as described in WO 01/79644 A1 and WO 03/040507 A1, provision may be made for the connecting joint to cooperate with the edge of a single substrate of the glazing or with the edges of a plurality of substrates of the glazing, while overlapping the laminating insert or the flat strip. The panels may be transparent, translucent or opaque.

Furthermore, the connecting joint may cooperate not only with the edges 21, 23, 21', 23', etc., of the panels, but also with their main faces 22, 24, 22' 24', etc. In particular, the connecting joint may cooperate with one edge of a first panel and one main face of a second panel, so as to create a T-shaped or L-shaped configuration. More generally, the connecting joint may ensure angular connection between the panels, so as to create any desired geometry of the glazed wall.

Furthermore, each support of the connecting joint may have any cross section other than those described above, which is adapted for cooperation with the faces of the panels. Whatever the embodiment, each support of the connecting joint may also equally well comprise volume cavities or a plurality of microcavities.

The invention claimed is:

1. A connecting joint for connection between a first panel and a second panel of a glazed wall, the connecting joint being adapted to cooperate with a face of each of the first panel and the second panel and comprising:

at least one support having a first external face and a second external face;

a first fastener arranged on the first external face of the at least one support, and a second fastener arranged on the second external face of the at least one support, wherein a right-angle separation force of the first fastener, measured on a glass panel with a mobile-jaw tensile testing machine with a 100mm/min displacement speed of the mobile jaw, lies between 3 and 20 N/cm, while the right-angle separation force of the second fastener, measured on a glass panel with a mobile jaw tensile testing machine with a 100 mm/min displacement speed of the mobile jaw, is greater than or equal to 30 N/cm.

2. The connecting joint as claimed in claim 1, wherein the first fastener is a first layer of adhesive arranged on the first external face of the at least one support, and the second fastener is a second layer of adhesive arranged on the second external face of the at least one support, a right-angle peeling force of the first layer of adhesive, measured on a glass panel with a mobile-jaw tensile testing machine with a 100 mm/min displacement speed of the mobile jaw, lying between 3 and 20 N/cm, while the right-angle peeling force of the second layer of adhesive, measured on a glass panel with a mobile-jaw tensile testing machine with a 100 mm/min displacement speed of the mobile jaw, is greater than or equal to 30 N/cm.

3. The connecting joint as claimed in claim 1, wherein the first fastener is a mechanical anchoring device carried by the first external face of the at least one support and constructed and arranged cooperate by shape complementarity with a relief pattern of a panel, and the second fastener is a layer of adhesive arranged on the second external face of the at least one support, the right-angle separation force of the mechanical anchoring device, measured on a glass panel with a mobile-jaw tensile testing machine with a 100 mm/min displacement speed of the mobile jaw, lying between 3 and 20 N/cm, while the right-angle separation force of the layer of adhesive, measured on a glass panel with a mobile-jaw tensile testing machine with a 100 mm/min displacement speed of the mobile jaw, is greater than or equal to 30 N/cm.

4. The connecting joint as claimed in claim 1, wherein at least one of the first and second fasteners is a mechanical anchoring device comprising a set of one or more hollows and one or more protuberances carried by the corresponding external face of the at least one support, so that the at least one support is arranged to be received with a force fit in a groove of the panel.

5. The connecting joint as claimed in claim 1, comprising a single support, the first fastener being arranged on the first external face of the support to cooperate with a face of the first panel, while the second fastener is arranged on the second external face of the support to cooperate with a face of the second panel.

6. The connecting joint as claimed in claim 1, wherein the at least one support comprises a first support and a second support, which have their first external faces facing one another and which are connected together by the first fastener, the second fastener being arranged on the second external face of the first support to cooperate with a face of the first panel, while the another second fastener is arranged on the second external face of the second support to cooperate with a face of the second panel.

7. The connecting joint as claimed in claim 1, wherein the at least one support comprises a first support and a second support, which have their second external faces facing one another and which are connected together by the second fastener, the first fastener being arranged on the first external face of the first support to cooperate with a face of the first panel, while the first fastener is arranged on the first external face of the second support cooperate with a face of the second panel.

8. The connecting joint as claimed in claim 1, wherein the at least one support comprises at least one part made of a thermoplastic polymer.

9. The connecting joint as claimed in claim 1, wherein the at least one support comprises at least one internal cavity.

10. The connecting joint as claimed in claim 9, wherein the at least one support is formed by a polymer foam comprising a plurality of microcavities.

11. The connecting joint as claimed in claim 1, wherein the at least one support has a quadrilateral cross section.

12. The connecting joint as claimed in claim 1, wherein the at least one support has an at least partially convex cross section.

13. The connecting joint as claimed in claim 1, wherein the at least one support has a cross section in the shape of a diabolo.

14. A glazed wall comprising a first panel and a second panel, and a connecting joint as claimed in claim 1, which cooperates with a face of each of the first panel and the second panel.

15. The glazed wall as claimed in claim 14, wherein the connecting joint fills a gap between the edges of the first and second panels and is flush with the main faces of the first and second panels.

16. The glazed wall as claimed in claim 14, wherein the first panel and the second panel each comprise a substrate made of glass or rigid polymer.

17. The glazed wall as claimed in claim 14, wherein at least one of the first and second panels comprises a groove having a cross section substantially complementary to that of a part of the at least one support of the connecting joint.

18. The glazed wall as claimed in claim 14, wherein one of the first and second fasteners of the connecting joint is a mechanical anchoring device, and one of the first and second panels comprises a groove which is adapted to receive the mechanical anchoring device with a force fit in its internal volume.

19. A panel having a plurality of faces, the panel comprising a connecting joint as claimed in claim 1 on at least one of the faces, one of the first and second fasteners cooperating with the at least one of the faces of the panel while the other of the first and second fasteners is available for connection to another panel.

20. A method for mounting a glazed wall comprising at least two panels as claimed in claim 19, the method comprising:

positioning the at least two panels in such a way that the face provided with the connecting joint of a first panel of the at least two panels faces a corresponding face of a second panel of the at least two panels;

securing the at least two panels by exerting a pressure force of the faces of the at least two panels toward one another so as to activate the available one of the first and second fasteners for connection.

21. A method for installing a connecting joint as claimed in claim 1 on a face of a panel, the method comprising:

placing the connecting joint opposite the face of the panel, with one of the first fastener and the second fastener facing said face of the panel, and exerting a force to press the connecting joint against the face of the panel, in a direction transverse to the face of the panel, so as to activate said one of the first and the second fastener which faces said face of the panel.

22. The connecting joint as claimed in claim 1, wherein the right-angle separation force of the first fastener is between 3 and 15 N/cm.

23. The connecting joint as claimed in claim 2, wherein the right-angle peeling force of the first layer of adhesive is between 3 and 15 N/cm.

24. The connecting joint as claimed in claim 3, wherein the right-angle separation force of the mechanical anchoring device is between 3 and 15 N/cm.

25. The connecting joint as claimed in claim 8, wherein the thermoplastic polymer is a thermoplastic elastomer.

* * * * *